United States Patent Office 3,090,765
Patented May 21, 1963

3,090,765
METHOD OF HYDROLYZING CHLOROSILANES
Siegfried Nitzsche and Ewald Pirson, Burghausen, Germany, assignors to Wacker-Chemie G.m.b.H., Munich, Bavaria, Germany
No Drawing. Filed July 13, 1960, Ser. No. 42,504
Claims priority, application Germany July 16, 1959
3 Claims. (Cl. 260—37)

This invention relates to a novel method of hydrolyzing chlorosilanes and producing powdery hydrolyzates.

Hydrolysis of masses of organochlorosilanes containing substantial quantities of monoorganotrichlorosilanes has heretofore resulted in production of coarse, hard, resin-like or flocked masses. The polyfunctionality of the monoorganotrichlorosilane results in extensive cross-linking, gelling and build up of three dimensional agglomerates. However, many applications require very fine particle size, powdery hydrolyzates of monoorganochlorosilanes. Thus under known methods, the hydrolysis product must be ground, pulverized or otherwise comminuted before use and this is commercially expensive, inconvenient and often difficult.

It is the object of this invention to introduce an hydrolysis method for chlorosilanes whereby finely divided hydrolyzates are obtained. A novel method for preparation of treated fillers for silicone rubber stocks and/or hydrophobizing agents for cements and other building materials is also an object of the invention. Other objects and advantages of this invention are detailed in or will be apparent from the disclosure and claims following.

The method of this invention is the hydrolysis of chlorosilanes wherein a substantial proportion of the silicon atoms have no more than one organic substituent bonded thereto by C—Si bonding, consisting of first adding to the hydrolysis water a small proportion of fine particle size silica and thereafter adding the chlorosilanes with concurrent stirring.

The silicas employed herein are those having an average particle size in the range of 3 to 100 millimicrons. The silica is employed in amounts ranging from 1 to 50 percent by weight, preferably 2 to 25 percent, based on the weight of silane to be hydrolyzed. The hydrolysis of chlorosilanes containing substantial proportions of silanes having one or less organic radicals per silicon atom, in the absence of silica, results in separation of the hydrolyzate from the water. The hydrolyzate deposits on the walls of the hydrolysis vessel and on the stirring apparatus. The solid masses of hydrolyzate contain appreciable quantities of occluded HCl. The hyrolyzate masses are difficult to remove from the reaction vessel and present a serious problem when the apparatus is to be washed. However, when the silica is present in the hydrolysis medium, a powdery product is obtained which can be easily removed, filtered or shaken out of the apparatus and the apparatus can then be washed out without leaving any residue, acid or other foreign matter.

The chlorosilanes employed herein contain 15 to 100 mol percent inclusive of monoorganotrichlorosilane such as alkyltrichlorosilane, aryltrichlorosilane and alkenyltrichlorosilane. Mixtures of monoorganotrichlorosilanes and up to 50 mol percent diorganodichlorosilane, monoorganohydrogenodichlorosilane and diorganohydrogenochlorosilane can also be employed. Mixtures of monoorganotrichlorosilanes and up to 85 mol percent of inorganic chlorosilanes such as $SiCl_4$, $Cl_3SiSiCl_3$ and $HSiCl_3$ can be employed. In short, the chlorosilane mixture employed herein contains 15 to 100 mol percent $RSiCl_3$, 0 to 50 mol percent $R_2SiCl_2$, $RHSiCl_2$ and/or $R_2HSiCl$; 0 to 85 mol percent $HSiCl_3$, $SiCl_4$, $Si_2Cl_6$, $Si_nCl_{2n+2}$ where $n$ is a positive integer. In all the formulae the symbol R represents organic substituents bonded to silicon by C—Si bonding and each R can be any alkyl radical such as methyl, ethyl, propyl, butyl and octadecyl, any aryl radical such as phenyl, diphenyl and anthracyl, and any alkenyl radical such as vinyl, allyl and octadecenyl.

An excess of water is employed to carry out the hydrolysis. The water is contained in a mixing vessel and the silica is added to the water and thoroughly dispersed therein. The chlorosilanes are added by any desired means but generally are carefully metered into the water-silica medium to prevent an excessively exothermic reaction. After complete hydrolysis the product is obtained by any desired separation means, dried and comminuted merely by application of light pressure such as by stirring the dried mass for a short period of time (e.g. 1 to 2 minutes).

The following examples are included herein to aid those skilled in the art to understand and practice this invention. The scope of the invention is defined in the appended claims and is not restricted by the examples.

Example 1

A mixing vessel was charged with 50 liters of water and 200 g. fume silica having an average particle size of 25 millimicrons, was added and dispersed through the water. The water-silica mixture was vigorously stirred and 5 kg. of $CH_3SiCl_3$ was added over a period of 10 minutes during which time the temperature of the mixture rose to 50° C. After all of the $CH_3SiCl_3$ had been added the stirring was terminated and the reaction mixture, which was strongly acidic due to the presence of HCl, was filtered. The reaction product was washed to neutrality with water and the water was removed by drying at an elevated temperature. After the drying step, the white mass obtained was easily powdered to a very fine white powder upon application of slight pressure. When this powder was employed in concrete mixes, hydrophobed concrete of superior strength was obtained.

Example 2

Following the procedure described in Example 1, 5 kg. of each of the following chlorosilane mixtures were hydrolyzed in 50 liters of water containing 100 g. of silica, particle size about 15 millimicrons:

[B] 55 mol percent $SiCl_4$ and 45 mol percent $C_6H_5SiCl_3$

[C] 85 mol percent $CH_3SiCl_3$, 11 mol percent $(CH_3)_2SiCH_2$ and 4 mol percent $(CH_3)_3SiCl$

[D] 80 mol percent $Cl_3SiSiCl_3$ and 20 mol percent $C_2H_5SiCl_3$

[E] 40 mol percent $CH_2=CHSiCl_3$ and 60 mol percent $CH_3SiCl_3$

[F] 50 mol percent $HSiCl_3$ and 50 mol percent $C_6H_5SiCl_3$

After filtering, washing and drying, a white mass was obtained in each case which would fall into a very fine powder upon applying light pressure.

That which is claimed is:

1. A method for producing powdery, resinous hydrolyzates by hydrolyzing chlorosilanes containing 15 to 100 mol percent $RSiCl_3$, 0 to 50 mol percent of organochlorosilanes selected from the group consisting of $R_2SiCl_2$, $RHSiCl_2$ and $R_2HSiCl$ and 0 to 85 mol percent of inorganic chlorosilanes selected from the group consisting of $HSiCl_3$ and $Si_nCl_{2n+2}$ where $n$ is a positive integer, where each R represents an organic substituent bonded to silicon by C—Si bonding and is selected from the group consisting of alkyl, aryl and alkenyl radicals, employing an excess of water containing 1 to 50 percent by weight, based on the weight of chlorosilanes to be hydrolyzed, of a fine particle fume silica having an average particle size in the range of 3 to 100 millimicrons, with stirring during addition of the chlorosilane to the water-fume silica mixture.

2. The method of claim 1 wherein the chlorosilane is $CH_3SiCl_3$.

3. The method of claim 1 wherein 2 to 20 percent by weight of fume silica, based on the weight of chlorosilanes to be hydrolyzed, is employed.

References Cited in the file of this patent

UNITED STATES PATENTS

| | | |
|---|---|---|
| 2,567,316 | Bidaud | Sept. 11, 1951 |
| 2,786,042 | Iler | Mar. 19, 1957 |
| 2,859,198 | Sears et al. | Nov. 4, 1958 |